United States Patent
Gu et al.

(10) Patent No.: US 10,494,278 B2
(45) Date of Patent: Dec. 3, 2019

(54) METHOD FOR IN-SITU HARMLESS TREATMENT OF CYANOPHYCEAN ACCUMULATION AND SUSPENDED SOLIDS IN LAKESIDE WETLANDS

(71) Applicant: NANJING INSTITUTE OF GEOGRAPHY & LIMNOLOGY, CHINESE ACADEMY OF SCIENCES, Nanjing, Jiangsu Province (CN)

(72) Inventors: Xiaozhi Gu, Nanjing (CN); Cheng Liu, Nanjing (CN); Kaining Chen, Nanjing (CN); Wei Huang, Nanjing (CN)

(73) Assignee: NANJING INSTITUTE OF GEOGRAPHY & LIMNOLOGY, CHINESE ACADEMY OF SCIENCES (CN)

( * ) Notice: Subject to any disclaimer, the term of this patent is extended or adjusted under 35 U.S.C. 154(b) by 2 days.

(21) Appl. No.: 15/924,221

(22) Filed: Mar. 18, 2018

(65) Prior Publication Data
US 2019/0194044 A1    Jun. 27, 2019

(30) Foreign Application Priority Data

Dec. 21, 2017    (CN) .......................... 2017 1 1395520

(51) Int. Cl.
*C02F 1/52* (2006.01)
*C02F 1/68* (2006.01)
(Continued)

(52) U.S. Cl.
CPC .......... *C02F 1/5272* (2013.01); *C02F 1/5236* (2013.01); *C02F 1/68* (2013.01);
(Continued)

(58) Field of Classification Search
CPC ........ C02F 1/52; C02F 1/5236; C02F 1/5272; C02F 1/5263; C02F 3/327; B01D 21/01; E02B 15/04
(Continued)

(56) References Cited

U.S. PATENT DOCUMENTS 7,758,752 B2 *   7/2010   Pan ......................... C02F 1/288
                                                            210/602

OTHER PUBLICATIONS

Zhang et al., CN103641223 Machine translation, pp. 1-7 (Year: 2013).*

* cited by examiner

*Primary Examiner* — Claire A Norris
(74) *Attorney, Agent, or Firm* — PROI Intellectual Property US (57) ABSTRACT

The invention discloses a method for harmless treatment of cyanophytes and suspended solids accumulated in lakeside wetlands, comprising the following steps: first, adding a flocculant to a water body to be treated, so as to allow the flocculation of cyanophytes to accumulate in the surface layer of the water body, and settling the formed cyanophycean floc to the surface layer of sediments; second, adding a floc stabilizer to perform accumulation and compaction of the cyanophycean floc and stabilized treatment of the floc in the surface layer; finally, conducting further reoxygenation treatment on the bottom water body. The method of the invention can realize efficient and ecologically safe flocculation of accumulated cyanophytes at low cost and control odor compounds such as sulfides decomposed from flocculated cyanophytes, so as to provide a new method for harmless treatment of excess cyanophycean accumulation in eutrophic lakes.

13 Claims, 6 Drawing Sheets

(51) Int. Cl.
*C02F 3/32* (2006.01)
*C02F 103/00* (2006.01)

(52) U.S. Cl.
CPC ........ *C02F 3/327* (2013.01); *C02F 2103/007* (2013.01); *C02F 2303/04* (2013.01)

(58) Field of Classification Search
USPC ..................................... 210/702, 723; 209/5
See application file for complete search history.

METHOD FOR IN-SITU HARMLESS TREATMENT OF CYANOPHYCEAN ACCUMULATION AND SUSPENDED SOLIDS IN LAKESIDE WETLANDS

TECHNICAL FIELD

The invention belongs to the technical field of environmental protection, and relates to a method for harmless treatment of cyanophytes in lakeside wetlands, in particular to a method for harmless treatment of cyanophycean accumulation in lakeside wetlands with large emergent aquatic plant communities such as *Phragmites australis* Trin. and *Typha latifolia* L.

BACKGROUND

Cyanophyte is a kind of prokaryote with a long history of evolution. The gram-negative, flagellum-free and chlorophyll-containing prokaryote does not form chloroplast, but it is capable of producing oxygen by photosynthesis. With the rapid economic development in China, water eutrophication has dramatically increased. In recent years, cyanobacterial blooms have broken out with large areas in Taihu Lake, Chaohu Lake and Dianchi Lake. Among them, the outbreak of cyanobacterial bloom in Taihu Lake has threatened the safety of drinking water of hundreds of thousands of people in Wuxi City.

At present, many researches have been made at home and abroad on the control of cyanophytes, but the treatments and disposal of cyanophytes have been far from enough to satisfy demand. Recently the problem has been brought into focus, which results in emergence of large quantities of technologies for harmless treatment of cyanophytes. At present, the harmless treatment of cyanophytes mainly include anaerobic fermentation for biogas production, combustion for power generation, extraction of useful substances like proteins, and direct feed preparation and aerobic compost, all of which require removing cyanophytes from the water body to achieve resource utilization, thus wasting a lot of manpower, material resources and financial resources.

Floatages of algae pulp accumulated in lakeside wetlands include algae, organic suspended solids of water body, suspended soil particles of water body, organic detritus, etc., which are mixed in the wetland plant communities and can easily form anaerobic decay under high temperature and poor water mobility in summer. As a result, a large amount of malodorous substances are produced and sharply deteriorated in short period, which cause severe water pollution. As an important part of the lake ecosystem, sediments not only provide important habitats for aquatic plants and benthic organisms but also are an important reservoir of pollutants. Cyanophyte is one of the main carriers for migration of biogenic elements such as carbon, nitrogen and phosphorus in water body, and contains a large amount of nutrients that can be reused by aquatic plants. The key link is the regulation of the release process of malodorous substances when cyanophytes are reused as nutrients. Ecological treatment of aquatic plants is considered as an efficient and sustain able option, and can reduce malodorous substance released through anaerobic decay of cyanophytes at low cost, so as to realize cyclic utilization of resources. Therefore, it provides a new thought of harmless treatment for excess cyanophycean accumulation in eutrophic lakes.

SUMMARY OF THE INVENTION

The invention is to provide an ecological restoration method for harmless treatment of cyanophycean accumulation in wetlands. The method can be used for treatment of a large amount of accumulated cyanophytes captured and enriched in wetland plant communities in urban river mouths or lake areas. The invention is expected to alleviate severe water ecological problem of water malodor and mass mortality of aquatic organisms due to decay of cyanophycean accumulation in wetlands during the summer and autumn months.

In order to achieve the purpose, the invention provides a method for harmless treatment of the cyanophycean accumulation in lakeside wetlands, comprising the following steps:

Step 1: adding a flocculant to a water body to be treated, so as to allow the flocculation of cyanophycean accumulation in the surface water, then settling the formed cyanophycean floc to the surface layer of sediments;

Wherein, the flocculant is a mixture of a modified starch solution and sand suspension; the modified starch can be used as a flocculant and provide the carbon source needed for the future cyanophytes fermentation; moreover, the starch is cheaper than most flocculants at present and is a natural substance without biological toxicity.

Step 2: adding a floc stabilizer to perform accumulation and compaction of the cyanophycean floc and stabilized treatment of the floc in the surface layer; specifically, for the cyanophycean floc settled to the sediment-water interface, allowing accumulation and compaction of the cyanophycean floc and stabilized treatment of the floc in the surface layer by the floc stabilizer;

Step 3: conducting reoxygenation treatment on the bottom water body.

According to the method of the invention, in step 1, a starch modifier is selected from diallyl dimethyl ammonium chloride or 3-chloro-2-hydroxypropyl trimethyl ammonium chloride; and substitution percentage of the starch modifier is 0.25 to 0.60.

Preferably, in step 1, the starch modifier is diallyl dimethyl ammonium chloride; and the substitution percentage of the starch modifier is 0.25 to 0.60.

According to the method of the invention, the modified starch is prepared as follows:

Step 1.1: starch pretreatment. First, weighing a certain amount of starch, adding an appropriate amount of distilled water and NaOH, then stirring and mixing well at 35° C. to make a 30% starch solution;

Step 1.2: ultrasonic coupling reaction of cationic etherifying agent and starch. Adding a certain amount of isopropanol before etherification of starch, stirring and mixing well, then adding a modifier into the starch solution to make cationic starch under the action of ultrasonic wave at 25 kHz and 650 W for a certain period of time.

Step 1.3: drying, purification and sizing to obtain high purity cationic starch. Taking out the prepared cationic starch, and washing with absolute ethyl alcohol to remove excess unreacted modifier and isopropanol. After filtering, blowing off the starch paste in the presence of $N_2$ for 3 h and then freeze-drying in vacuum to obtain a modified starch with high degree of substitution.

According to the method of the invention, in step 1, the sand is quartz sand with plant residues and shells therein being removed and with a particle size of 20-200 meshes, and the clay content in impurities is less than 1%.

According to the method of the invention, in step 1, the flocculant is prepared by mixing the modified starch solution and the quartz sand suspension; wherein the modified starch solution is added into the water body to reach the final concentration of 0.5 to 6 g/L. In the invention, the modified starch in the flocculant is used as a flocculation component and the quartz sand is used for accelerating the precipitation. The mother liquor of the modified starch stock solution and of the quartz sand is prepared and mixed with a certain proportion of water and then sprayed into the water body.

According to the method of the invention, in step 2, the floc stabilizer is quicklime, with a solid particle size of 0.01 to 5 mm and the impurity content of less than 5%. Preferably, quicklime is prepared into a suspension of 1 to 10 g/L, the floc stabilizer is added in the form of underwater spraying, and the spraying height of the quicklime suspension is 10 to 20 cm above the floc. To reduce secondary pollution in introducing allogenic materials into the water body, the dosage should be minimized on the basis of ensuring effect and the preferable dose concentration is 450 to 3000 mg/L depending on the ratio of suspended solids, algae species and their quantity in a water body. The dosage shall be adjusted when necessary.

The method of the invention further comprises, in step 2, spraying a matrix modifier to the surface of the cyanophycean floc after floc stabilization, wherein the matrix modifier is a mixture of carbon, diatomite and lakeside soil, and the mass ratio of the three substances in the modifier is 5-10:1.5-8: 10-16. Preferably, the diatomite material has a particle size of 0.01 mm to 2 mm, and the content of diatomite $SiO_2$ is generally greater than 90%. In order to further reduce and eliminate toxic and harmful substances released in the decay process of cyanophytes, the matrix modifier of a certain concentration is necessarily sprayed to the surface of the cyanophytes floc after floc stabilization.

Further, the matrix modifier is applied by adding diatomite and carbon successively, and then adding lakeside soil, wherein the lakeside soil is mainly the dredged sediment near wetlands or bare soil on the lakeside, and the amount of the lakeside soil added to the water body finally reaches 10 to 200 g/L.

Further, the carbon for the matrix modifier is selected from the biological carbon consisting of difficult-to-be-decomposed stems and leaves of the wetland plants and easy-to-be-decomposed stems and leaves thereof; the difficult-to-be-decomposed stems and leaves of the wetland plants are selected from one or more of *Phragmites australis* Trin., *Typha latifolia* L. and *Oryza sativa* L. stalks; the easy-to-be-decomposed stems and leaves thereof are selected from one or more of *Vallisneria natans* (Lour.) Hara, *Potamogeton maackianus* A. Benn. and *Nymphoides peltatum* (Gmel.) O. Kuntze; the mixing mass ratio of the difficult-to-be-decomposed stems and leaves of the wetland plants to the easy-to-be-decomposed stems and leaves thereof is 2-5:0.2-1.5, depending on the composition of stems and leaves of plants, the ratio of emergent plant to submerged plant and the ratio of respective stems and leaves to be added, and the adding mode is of low dosage and multiple standard addition method.

According to the method of the invention, the reoxygenation treatment method in step 3 includes planting oxygenated aquatic plants to re-oxygenate the water body and/or adding a sodium percarbonate solution thereto; wherein the aquatic plants are floating-leaved plants of productive oxygen-release, including *Myriophyllum elatinoides* Gaudich., *Nymphoides peltatum*(Gmel.) O. Kuntze and *Hydrocotyle vulgaris*; and the sodium percarbonate solution is added by multi-point high-pressure injection to the bottom algae flocs and surface sediments. The main purpose of reoxygenation is to regulate malodorous substances such as methyl sulfide released through the anaerobic decay in the matrix process of algae.

Preferably, the reoxygenation treatment method includes planting oxygenated aquatic plants to re-oxygenate the water body and/or adding a sodium percarbonate solution thereto; wherein the oxygenated aquatic plants are selected from *Myriophyllum elatinoides* Gaudich., *Nymphoides peltatum* (Gmel.) O. Kuntze; and the sodium percarbonate solution is added by multi-point high-pressure injection to the bottom algae flocs and surface sediments.

Specifically, the disposing method of the oxygenated aquatic plants is as follows: after matrix pretreatment of algal flocculation, 10% to 35% of *Myriophyllum elatinoides* Gaudich. and 10% to 25% of *Nymphoides peltatum*(Gmel.) O. Kuntze are covered in the surface water body. *Myriophyllum elatinoides* Gaudich. is planted such that stem and leaf propagules are directly sowed. *Nymphoides peltatum* (Gmel.) O. Kuntze is planted through underground stem and leaf propagules. In the planting process, two highly reoxygenated plants are planted in a cluster way, and the diameter of the community coverage is kept within 1 to 5 m. Based on the planting density of 5 to 8 plants/m² and 3 to 5 plants/m² respectively, *Myriophyllum elatinoides* Gaudich. and *Nymphoides peltatum*(Gmel.) O. Kuntze are planted in lakeside area to restore vegetation and finally form a large emergent-foliage plant community with the vegetation coverage of 45-60%.

The reoxygenation method for sodium percarbonate is to prepare a certain amount of mother liquor stock solution of 0.5 to 150 g/L. The final dosage added to the water body is 50 to 2500 mg/L, the content of pure substance in sodium percarbonate is more than 90%, the sodium percarbonate solution is added by multi-point high-pressure injection to the bottom algae flocs and surface sediments, depending on the number and species of the cyanobacteria flocculation on the surface layer of the injection concentration.

The technical progress and beneficial effects of the invention are as follows:

(1) In the invention, the floatages of cyanobacteria accumulation in lakeside wetlands include algae, organic suspended solids of water body, suspended soil particles of water body, organic detritus, etc. which are mixed in the wetland plant communities and can easily form anaerobic decay under high temperature and poor water mobility in summer. As a result, a large amount of malodorous substances are produced and sharply deteriorated in short period, which cause severe water pollution. The invention provides a complete set of technology for harmless disposal of algae pulp accumulated in lakeside wetlands, which overcomes key technical difficulties such as dirty water, anaerobic and high organic pollution loads, and successfully achieves ecological restoration of water bodies for the purpose of long-term treatment.

(2) For technical links involved in the sediment pretreatment technology such as surface algal flocculation and floc stabilization of flocculation settling algae, the in-situ treatment method is used so as not to cause secondary environmental pollution on the water body, for it neither takes up new land space nor involves handling and storage of sediments and algae pulp. Furthermore, because of short treatment period and rapid effect, the in-situ harmless algae pulp treatment method can be performed immediately after pretreatment, and a comprehensive restoration target can also be achieved in the same year, i.e. long-lasting biological reoxygenation deodorant comprehensive links of the polluted water body.

(3) The restorative materials involved in the invention such as quartz sand, slaked lime and clay minerals are all eco-friendly materials and may be applied to ecological engineering practice of river regulation due to low cost and wide sources. The materials for plant reoxygenation are mainly indigenous species of lakes, thus avoiding such ecological problem as species invasion due to new species introduced.

(4) The algal floc on the surface layer of sediments is prone to secondary suspension and water pollution and the released pollutants are mainly volatile sulfur compounds that are easily oxidized and volatile. In the technical solution, self-regulating function of the ecosystem is fully considered to reduce frequency and strength of human disturbance. The technological advantage is reflected in the following aspects: by creating efficient natural reoxygenation condition of sediments, the majority of volatile sulfur components in the sediment are firstly removed through natural reoxygenation of the surface sediments and the promotion of volatilization. The first floc fixation rate of the invention is more than 80%, which meets the plant growth requirements for ecological restoration of general river sediments. Then, the purpose of in-situ transformation and removal of residual sulfide is achieved by some comprehensive disposal measures such as adding a sediment modifier to achieve auxiliary chemical passivation, oxidization and secretion of large aquatic plants. Through adjustment of internal composition of the ecosystem, a virtuous cycle of the aquatic ecosystem in lakeside area is finally achieved.

(5) The technical solution provided by the invention relates to a complete set of technology, i.e. initial chemical reoxygenation+post-aquatic plant reoxygenation applicable to the anaerobic water body, which successfully realizes efficient, sustainable and low-carbon cyclic reoxygenation of water bodies and long-term remediation of black stinky silt sulfide pollution. The steps are as follows: removing or reducing the main stress factors for plant growth after pretreatment of sediments, then directly remediating efficient reoxygenated plants on the pollution layer of severe sulphur pollution, so as to achieve the purpose of synchronous emergency disposal and long-term treatment of odorous sulfur contaminated sediment, based on the emergency disposal of sediment modifier as well as the stratified control principles of plant restoration and in-situ sulfide transformation.

DETAILED DESCRIPTION OF THE PREFERRED EMBODIMENT

The technical solution of the invention will be described in detail in combination with drawings and examples. The protection scope of the invention is not limited to the specific embodiments, but is defined by the claims.

Example 1

Considering that a large amount of accumulated cyanophytes are captured and enriched in eugenic reed wetland plant communities in Gonghu Bay, Taihu Lake, the harmless treatment method of the invention is expected to alleviate severe water ecological problem of water malodor and mass mortality of aquatic organisms due to decay of cyanophycean accumulation in wetlands.

The embodiment is as follows:

1) Disposal of flocculation and sedimentation of cyanophycean accumulation in reed wetlands. First, a water sample collected from the wetland cyanophycean accumulation area is analyzed in a laboratory to determine such indicators as algae density, total amount of suspended solids, concentration of substance methyl sulfur-taste odor, dissolved organic carbon and ionic strength in water, so as to preliminarily determine the dosage of diallyl dimethyl ammonium chloride with the degree of substitution of 0.25 and of 20-mesh quartz sand added to cyanophycean flocculation accumulated in wetlands. The diallyl dimethyl ammonium chloride is modified to obtain a modified starch with the degree of substitution of 0.25. Later, a diallyl dimethyl ammonium chloride-modified starch stock mother liquor of 50 g/L is prepared as a flocculant. When the algae density of the reeds in the cyanophycean accumulation area of lakeside wetlands is 0.03 to 15 mg/L, the diallyl dimethyl ammonium chloride-modified starch stock mother liquor is added to the lake to obtain a final concentration of 5 g/L. After flocculation for 1 h, a quartz sand suspension of 50 mg/L is further sprayed to accelerate sedimentation of the flocculation on the surface sediments.

2) In-situ matrix pretreatment of sedimentary cyanophytes. A quicklime suspension of 8 g/L is added to the sedimentary algal floc in the form of underwater spraying, depending on the ratio of the algae pulp to the floc stabilizer of 30:1, approximately 1.45 g/L in water. The spraying height of the quicklime suspension is 10 to 20 cm above the floc which is stabilized for 6 h. A modifier is added to the fixed algae floc for harmless treatment of the algae pulp matrix. The modifier is a mixture of diatomite, biological carbon and lakeside soil, in which the diatomite of 6 g/L and the lakeside soil of 10 g/L are added. The suspension is sprayed on the diatomite and the lakeside soil underwater and the particle size of species to be added is 40 to 60 meshes. The biological carbon is selected from a mixture formed by crushed stems and leaves of difficult-to-be-decomposed reeds and easy-to-be-decomposed *Potamogeton malaianus* based on the ratio of 2:1.5, and the specific dosage is 1.5 g/L in engineering practices. To add a modifier, the diatomite and the lakeside soil are added orderly until most of them are settled; then biological carbon is added. Through this step, the algae floc and suspended solids in water are fixed to the underwater boundary layer. So, water transparency is significantly increased and water anaerobic status can be significantly reversed.

3) Advanced and optimized disposal of matrix process of accumulated cyanophytes. Through pretreatment in step 2, water is subject to biological reoxygenation by efficient oxygenated aquatic plants. Specifically, the floating-leaved plant of *Nymphoides peltatum*(Gmel.) O. Kuntze and the floating plant of *Myriophyllum elatinoides* Gaudich. are planted within 15 days when the water habitat is significantly improved after flocculation of fronds. The specific planting method is as follows: based on the planting density of 4 plants/m$^2$ and 8 plants/m$^2$ respectively, *Nymphoides peltatum*(Gmel.) O. Kuntze and *Myriophyllum elatinoides* Gaudich. are planted in the wetland cyanophycean accumulation area to finally form a community of *Myriophyllum elatinoides* Gaudich. and *Nymphoides peltatum*(Gmel.) O. Kuntze with the coverage of 25% and 15% on the water surface.

Figure 1A:
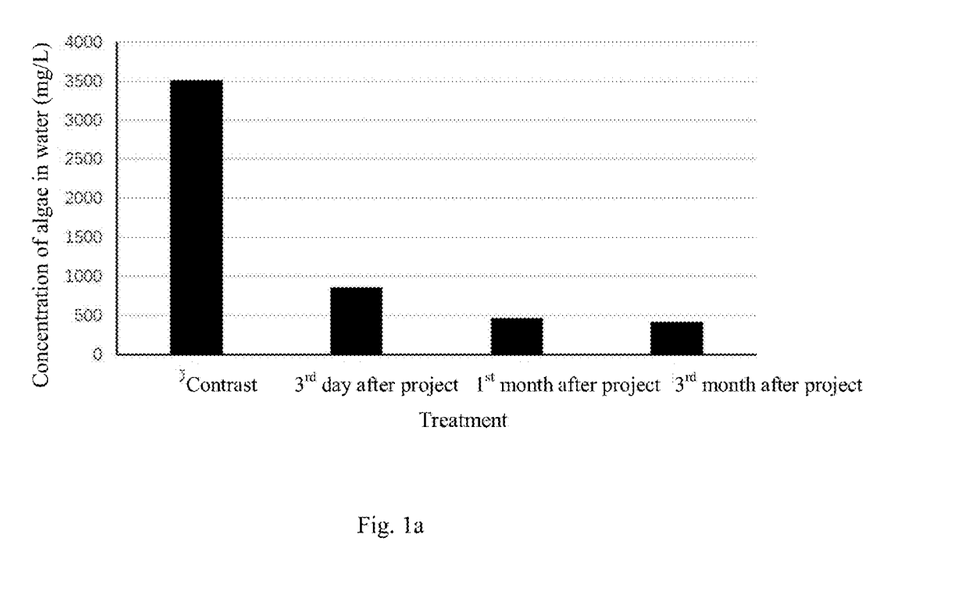
FIG. 1a is a dynamic diagram of the biomass of algae in a water body before and after ecological rehabilitation project of cyanophycean accumulation in the reed wetland in example 1.
Figure 1B:
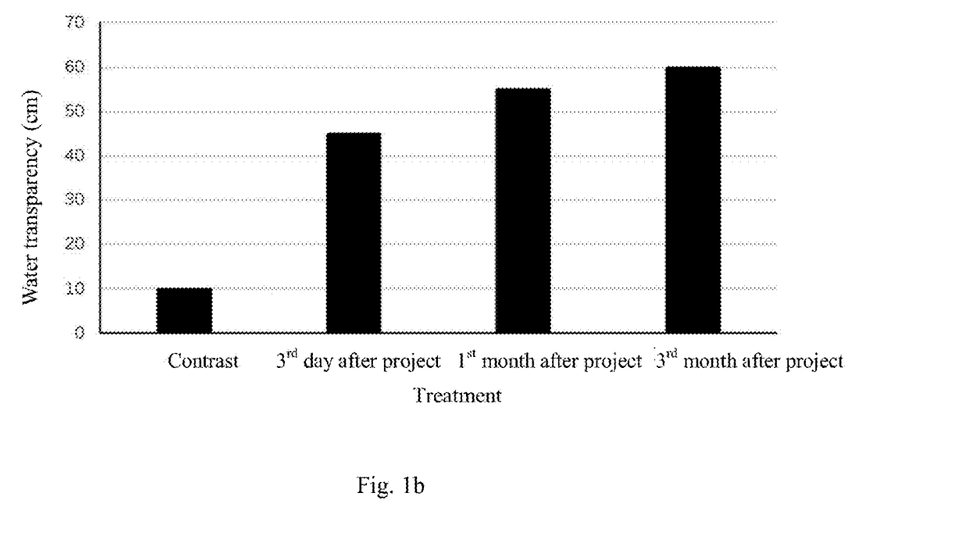
FIG. 1b is a dynamic diagram of water transparency after implementation of the project in example 1.
Figure 1C:
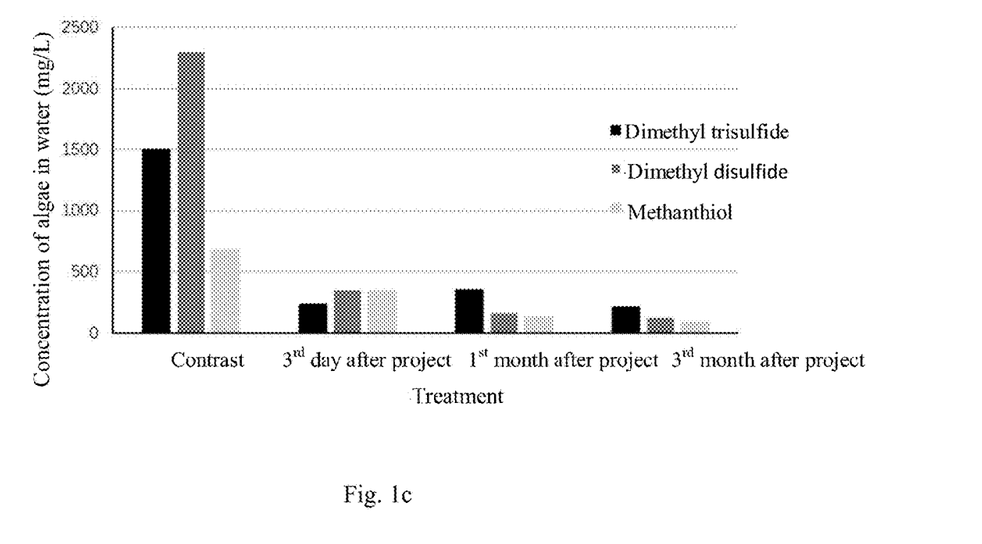
FIG. 1c is a dynamic diagram of volatile sulfur compounds in a water body after implementation of the project in example 1.

As shown in FIG. 1*a-c*, algae and water quality are continuously monitored after the ecological project is completed. It is found that volatile sulphur compounds causing water odor decrease obviously, the total amount of algae and organic suspended matter accumulated in water body decreases significantly, and the dissolved oxygen of the water body significantly increases. The algae removal rate (acid volatile sulfide) of the water body decreases by 76-88% (average: 84%) over the control area within three months after the project implementation. The transparency of the water body is raised from less than 10 cm to 45 cm within three days after the project implementation, and is 55 to 60 cm after three months. Volatile sulphur compounds causing water malodor decrease significantly. The average removal rates of DMDS, DMTS and MTL are 91%, 82% and 73% respectively. The biomass of reed root and the plant height increase by 25% and 32% compared with the control area. Thus, water malodor is basically eliminated, the appearance of water of pollution and malodor is obviously improved, water quality continues to improve obviously, and water ecological function improves preliminarily.

Example 2

Considering that a large amount of accumulated cyanophytes are captured and enriched in eugenic reed wetland plant communities in Gonghu Bay, Taihu Lake, the harmless treatment method of the invention is expected to alleviate severe water environment problems of water malodor due to decay of cyanophycean accumulation in wetlands.

The embodiment is as follows:

1) Disposal of flocculation and sedimentation of cyanophycean accumulation in reed wetlands. First, a water sample collected from the wetland cyanophycean accumulation area is analyzed in a laboratory to determine such indicators as algae density, total amount of suspended solids, concentration of substance methyl sulfur-taste odor, dissolved organic carbon and ionic strength in water, so as to preliminarily determine the dosage of diallyl dimethyl ammonium chloride with the degree of substitution of 0.60 and of 200-mesh quartz sand added to cyanophycean flocculation accumulated in wetlands. The diallyl dimethyl ammonium chloride is modified to obtain a modified starch with the degree of substitution of 0.60. Later, a diallyl dimethyl ammonium chloride-modified starch stock mother liquor of 50 g/L is prepared as a flocculant. When the algae density of the reeds in the cyanophycean accumulation area of lakeside wetlands is 0.1 to 8.5 mg/L, the modified starch stock mother liquor is added to the lake to obtain a final concentration of 0.5 g/L. After flocculation for 1 h, a quartz sand suspension of 80 mg/L is further sprayed to accelerate sedimentation of the flocculation on the surface sediments.

2) In-situ matrix pretreatment of sedimentary cyanophytes. A quicklime suspension of 1 g/L is added to the sedimentary algal floc in the form of underwater spraying, depending on the ratio of the algae pulp to the floc stabilizer of 25:1, approximately 1.25 g/L in water. The spraying height of the quicklime suspension is 10 to 20 cm above the floc which is stabilized for 6 h. A modifier is added to the fixed algae floc for harmless treatment of the algae pulp matrix. The modifier is a mixture of diatomite, biological carbon and lakeside soil, in which the diatomite of 5 g/L and the lakeside soil of 15 g/L are added. The suspension is sprayed on the diatomite and the lakeside soil underwater and the particle size of species to be added is 40 to 60 meshes. The biological carbon is selected from a mixture formed by crushed stems and leaves of difficult-to-be-decomposed reeds, cattail and straw stalk as well as easy-to-be-decomposed *Nymphoides peltatum*(Gmel.) O. Kuntze based on the ratio of 5:0.2, and the specific dosage is 2.5 g/m$^2$. Through this step, the algae floc and suspended solids in water are fixed to the underwater boundary layer. So, water transparency is significantly increased and water anaerobic status can be significantly reversed.

3) Advanced and optimized disposal of matrix process of accumulated cyanophytes. First, the sodium percarbonate solution is added by multi-point high-pressure injection to the bottom algal flocs and the surface sediments on the algal floc sedimentary layer after floc stabilization, and the concentration of the solution added to the water body is 2500 mg/L. After pretreatment of the sedimentary floc, water is subject to biological reoxygenation. The specific method is to restore aquatic plant community of the flocculated fronds. The floating-leaved plant of *Nymphoides peltatum*(Gmel.) O. Kuntze and the floating plant of *Myriophyllum elatinoides* Gaudich. are planted within 15 days when the water habitat is significantly improved after flocculation of fronds. The specific planting method is as follows: based on the planting density of 5 plants/m$^2$ and 6 plants/m$^2$ respectively, *Nymphoides peltatum*(Gmel.) O. Kuntze and *Myriophyllum elatinoides* Gaudich. are planted in the wetland cyanophycean accumulation area to finally form a community of *Myriophyllum elatinoides* Gaudich. and *Nymphoides peltatum*(Gmel.) O. Kuntze with the coverage of 25% and 15% on the water surface.

Figure 2A:
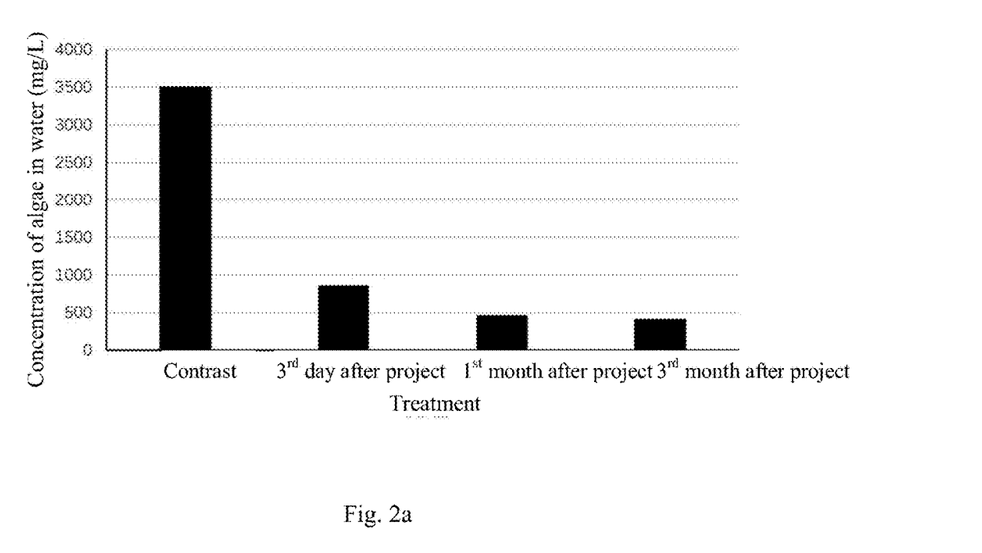
FIG. 2a is a dynamic diagram of the biomass of algae in a water body before and after ecological rehabilitation project of cyanophycean accumulation in the reed wetland in example 2.
Figure 2B:
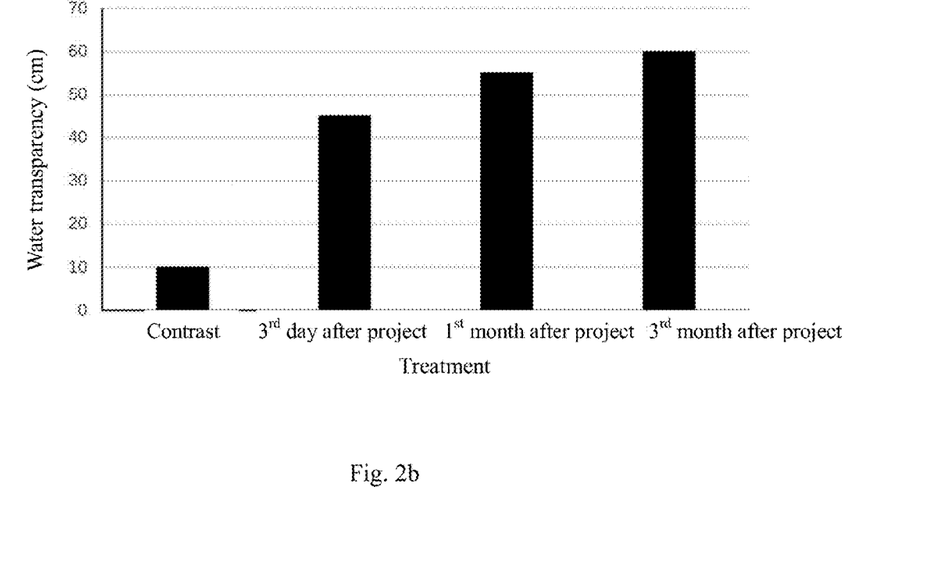
FIG. 2b is a dynamic diagram of water transparency after implementation of the project in example 2.
Figure 2C:
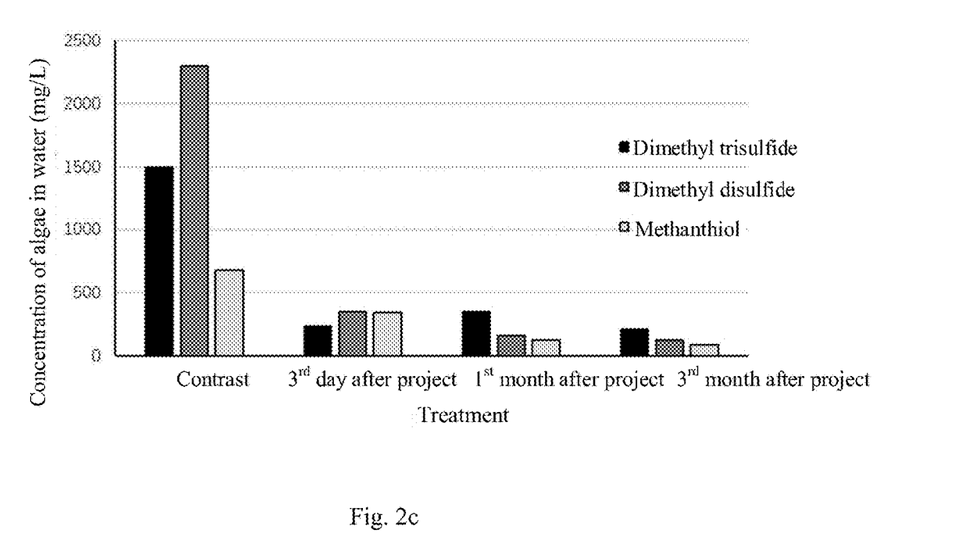
FIG. 2c is a dynamic diagram of volatile sulfur compounds in a water body after implementation of the project in example 2.

As shown in FIG. 2*a-c*, algae and water quality are continuously monitored after the ecological project is completed. It is found that volatile sulphur compounds causing water odor decrease obviously, the total amount of algae and organic suspended matters accumulated in water body significantly decreases, and the dissolved oxygen of the water body significantly increases. The algae removal rate (acid volatile sulfide) of the water body decreases by 75-83% (average: 80%) over the control area within three months after the project implementation. The transparency of the water body is raised from 15 cm to 50 cm within three days after the project implementation, and is 60 to 65 cm after three months. Volatile sulphur compounds causing water malodor decrease significantly. The average removal rates of DMDS, DMTS and MTL are 95%, 92% and 75% respectively. The biomass of reed root and the plant height increase by 35% and 28% compared with the control area. Thus, water malodor is basically eliminated, water pollution and malodor is obviously improved, water quality continues to improve obviously, and water ecological function improves preliminarily.

Example 3

Considering that a large amount of accumulated cyanophytes are captured and enriched in eugenic reed wetland plant communities in Paihe River mouth, Caohu Lake, the harmless treatment method of the invention is expected to alleviate severe water environment problems of water malodor due to decay of cyanophycean accumulation in wetlands.

The embodiment is as follows:

1) Disposal of flocculation and sedimentation of cyanophycean accumulation in reed wetlands. First, a water sample collected from the wetland cyanophycean accumulation area is analyzed in a laboratory to determine such indicators as algae density, total amount of suspended solids, concentration of substance methyl sulfur-taste odor, dissolved organic carbon and ionic strength in water, so as to preliminarily determine the dosage of diallyl dimethyl ammonium chloride with the degree of substitution of 0.45 and of 80-mesh quartz sand added to cyanophycean flocculation accumulated in wetlands. The diallyl dimethyl ammonium chloride is modified to obtain a modified starch with the degree of substitution of 0.45. Later, a diallyl dimethyl ammonium chloride-modified starch stock mother liquor of 80 g/L is prepared as a flocculant. When the algae density of the reeds in the cyanophycean accumulation area of lakeside wetlands is 0.5 to 35 mg/L, the modified starch is added to the lake to obtain a final concentration of 2 g/L. After flocculation for 1 h, a quartz sand suspension of 150 mg/L is further sprayed to accelerate sedimentation of the flocculation on the surface sediments.

2) In-situ matrix pretreatment of sedimentary cyanophytes. A quicklime suspension of 10 g/L is added to the sedimentary algal floc in the form of underwater spraying, depending on the ratio of the algae pulp to the floc stabilizer of 25:1, approximately 1.65 g/L in water. The spraying height of the quicklime suspension is 10 to 20 cm above the floc which is stabilized for 6 h. A modifier is added to the fixed algae floc for harmless treatment of the algae pulp matrix. The modifier is a mixture of diatomite, crushed straw stalks and wild celery leaves, and lakeside soil, in which the diatomite of 10 g/L and the lakeside soil of 16 g/L are added. The suspension is sprayed on the diatomite and the lakeside soil underwater and the particle size of species to be added is 40 to 60 meshes. The crushed straw stalks and wild celery leaves are mixed based on the mass ratio of 3:1 and the dosage is 8 g/m². Through this step, the algae floc and suspended solids in water are fixed to the underwater boundary layer. So, water transparency is significantly increased and water anaerobic status can be significantly reversed.

3) Advanced and optimized disposal of matrix process of accumulated cyanophytes. First, sodium percarbonate solution is added in the form of underwater spraying to 2 to 5 cm above the algal floc sedimentary layer after floc stabilization, and the final concentration of the solution added to the water is 350 mg/L. After pretreatment of the surface floc, water is subject to biological reoxygenation. The specific method is to restore aquatic plant community of the flocculated fronds. The floating-leaved plant of *Nymphoides peltatum*(Gmel.) O. Kuntze and the floating plant of *Myriophyllum elatinoides* Gaudich. are planted within 15 days when the water habitat is significantly improved after flocculation of fronds. The specific planting method is as follows: based on the planting density of 5 plants/m² and 6 plants/m² respectively, *Nymphoides peltatum*(Gmel.) O. Kuntze and *Myriophyllum elatinoides* Gaudich. are planted in the wetland cyanophycean accumulation area to finally form a community of *Myriophyllum elatinoides* Gaudich. and *Nymphoides peltatum*(Gmel.) O. Kuntze with the coverage of 25% and 15% on the water surface.

Figure 3A:
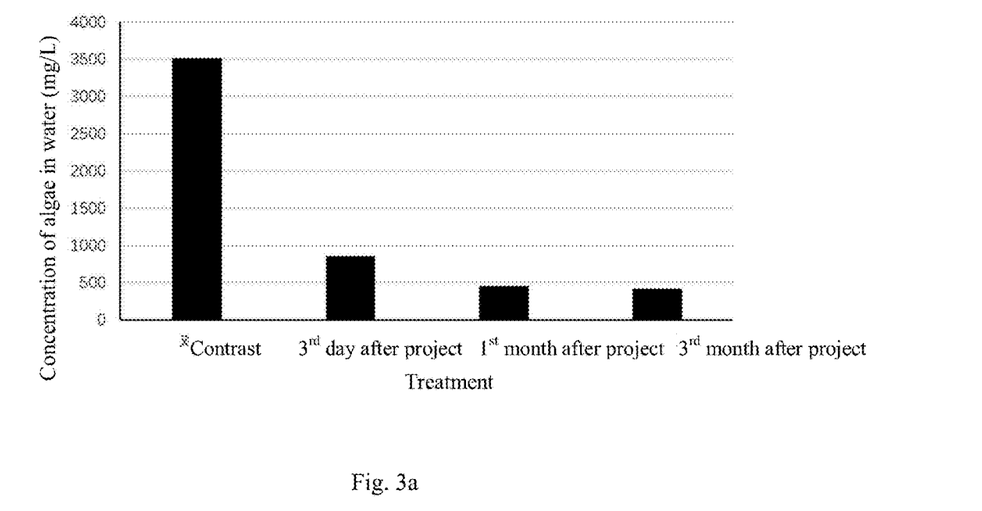
FIG. 3a is a dynamic diagram of the biomass of algae in a water body before and after ecological rehabilitation project of cyanophycean accumulation in the reed wetland in example 3.
Figure 3B:
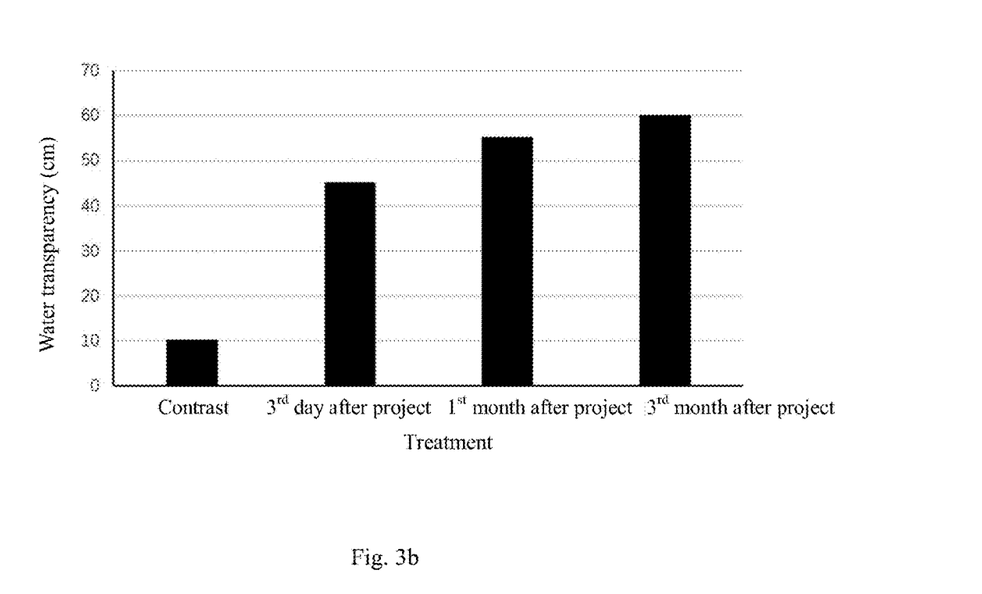
FIG. 3b is a dynamic diagram of water transparency after implementation of the project in example 3.
Figure 3C:
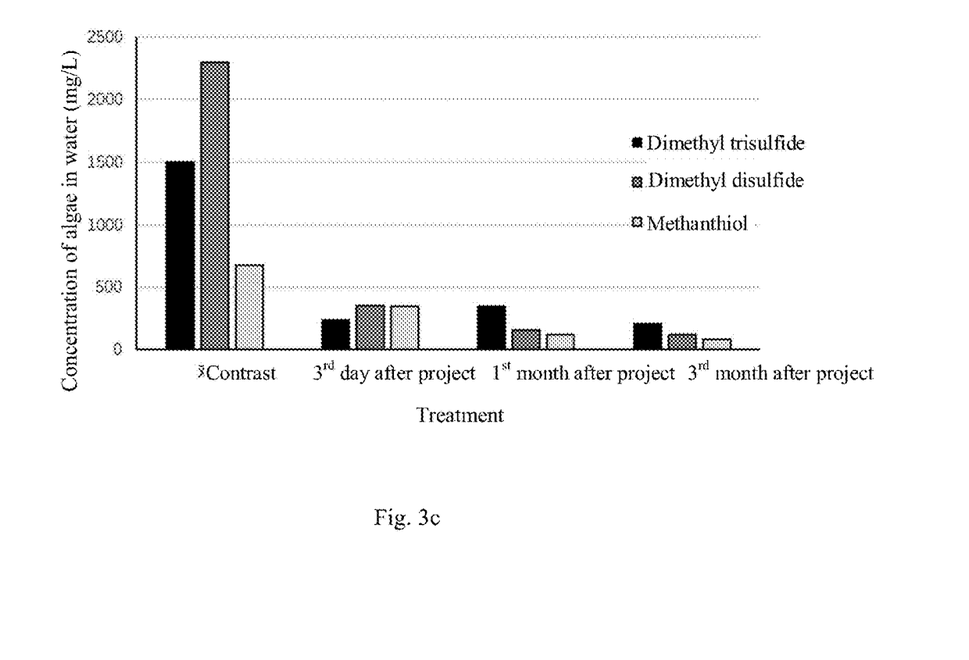
FIG. 3c is a dynamic diagram of volatile sulfur compounds in a water body after implementation of the project in example 3.

As shown in FIG. 3a-c, algae and water quality are continuously monitored after the ecological project is completed. It is found that volatile sulphur compounds causing water odor decrease obviously, the total amount of algae and organic suspended matters accumulated in water body significantly decreases, and the dissolved oxygen of the water body significantly increases. The algae removal rate of the water body decreases by 82-91% (average: 86%) over the control area within three months after the project implementation. The transparency of the water body is raised from less than 15 cm to 55 cm within three days after the project implementation, and is 50 to 55 cm after three months. Volatile sulphur compounds causing water malodor decrease significantly. The average removal rates of DMDS, DMTS and MTL are 84%, 80% and 83% respectively. The biomass of reed root and the plant height increase by 35% and 22% compared with the control area. Thus, water malodor is basically eliminated; water pollution and malodor, water quality and water ecological function are obviously improved.

Example 4

Considering that a large amount of accumulated cyanophytes are captured and enriched in eugenic reed wetland plant communities in lakeside area, Nanfei River mouth, Caohu Lake, the harmless treatment method of the invention is expected to alleviate severe water environment problems of water malodor due to decay of cyanophycean accumulation in wetlands.

The embodiment is as follows:

1) Disposal of flocculation and sedimentation of cyanophycean accumulation in reed wetlands. First, a water sample collected from the wetland cyanophycean accumulation area is analyzed in a laboratory to determine such indicators as algae density, total amount of suspended solids, concentration of substance methyl sulfur-taste odor, dissolved organic carbon and ionic strength in water, so as to preliminarily determine the dosage of 3-chloro-2-hydroxypropyl trimethyl ammonium chloride-modified starch with the degree of substitution of 0.60 and of 80-mesh quartz sand added to cyanophycean flocculation accumulated in wetlands. Then 3-chloro-2-hydroxypropyl trimethyl ammonium chloride-modified starch stock mother liquor of 150 g/L is prepared as a flocculant. When the algae density of the reeds in the cyanophycean accumulation area of lakeside wetlands is 0.5 to 35 mg/L, the 3-chloro-2-hydroxypropyl trimethyl ammonium chloride is added to the lake to obtain a final concentration of 4 g/L. After flocculation for 1 h, a quartz sand suspension of 150 mg/L is further sprayed to accelerate sedimentation of the flocculation on the surface sediments.

2) In-situ matrix pretreatment of sedimentary cyanophytes. A quicklime suspension of 10 g/L is added to the sedimentary algal floc in the form of underwater spraying, depending on the ratio of the algae pulp to the floc stabilizer of 25:1, approximately 1.65 g/L in water. The spraying height of the quicklime suspension is 10 to 20 cm above the floc which is stabilized for 6 h. A modifier is added to the fixed algae floc for harmless treatment of the algae pulp matrix. The modifier is a mixture of diatomite, crushed straw stalks and wild celery leaves, and lakeside soil, in which the diatomite of 10 g/L and the lakeside soil of 16 g/L are added. The suspension is sprayed on the diatomite and the lakeside soil underwater and the particle size of species to be added is 40 to 60 meshes. The crushed straw stalks and wild celery leaves are mixed based on the mass ratio of 3:1 and the dosage is 2 g/L. Through this step, the algae floc and suspended solids in water are fixed to the underwater boundary layer. So, water transparency is significantly increased and water anaerobic status can be significantly reversed.

3) Advanced and optimized disposal of matrix process of accumulated cyanophytes. First, sodium percarbonate solution is added in the form of underwater spraying to 2 to 5 cm above the algal floc sedimentary layer after floc stabilization, and the final concentration of the solution added to the water is 500 mg/L. After pretreatment of the surface floc, water is subject to biological reoxygenation. The specific method is to restore aquatic plant community of the flocculated fronds. The floating-leaved plant of *Nymphoides peltatum*(Gmel.) O. Kuntze and the floating plant of *Myriophyllum elatinoides* Gaudich. are planted within 20 days when water habitat is significantly improved after flocculation of fronds. The specific planting method is as follows: based on the planting density of 8 plants/m² and 5 plants/m² respectively, *Nymphoides peltatum*(Gmel.) O. Kuntze and *Myriophyllum elatinoides* Gaudich. are planted in the wetland cyanophycean accumulation area to finally form a community of *Myriophyllum elatinoides* Gaudich. and *Nymphoides peltatum*(Gmel.) O. Kuntze with the coverage of 25% and 15% on the water surface.

Figure 4A:
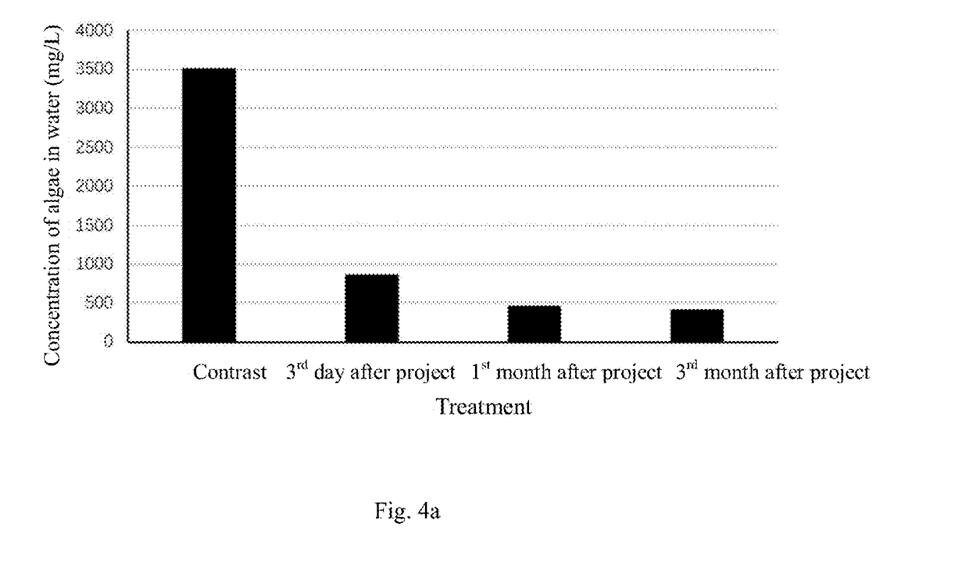
FIG. 4a is a dynamic diagram of the biomass of algae in a water body before and after ecological rehabilitation project of cyanophycean accumulation in the reed wetland in example 4.
Figure 4B:
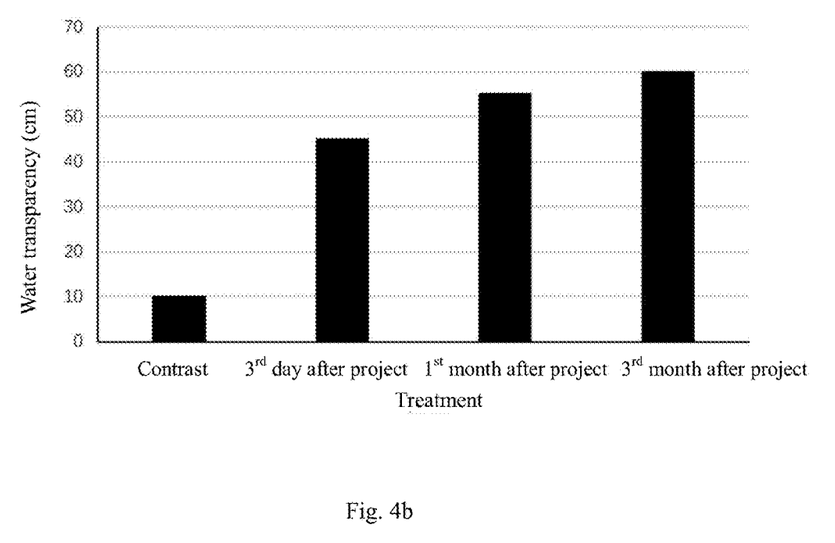
FIG. 4b is a dynamic diagram of water transparency after implementation of the project in example 4.
Figure 4C:
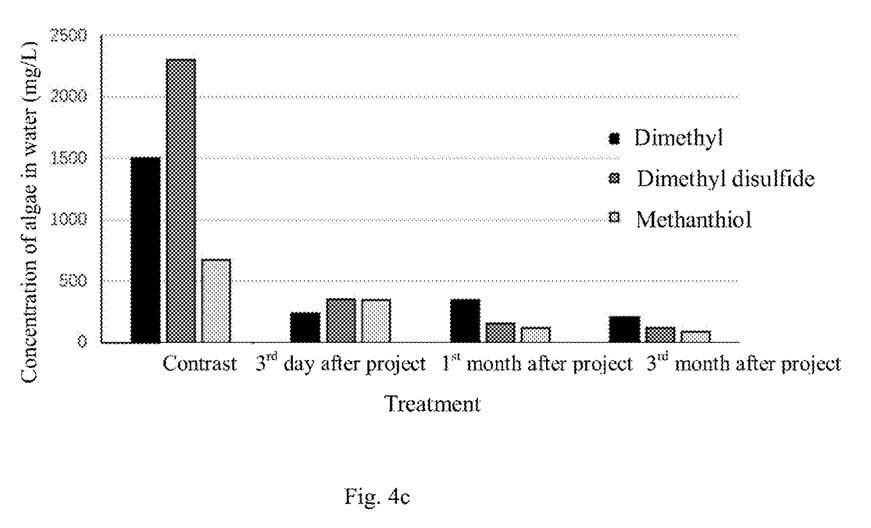
FIG. 4c is a dynamic diagram of volatile sulfur compounds in a water body after implementation of the project in example 4.

As shown in FIG. 4a-c, algae and water quality are continuously monitored after the ecological project is completed. It is found that volatile sulphur compounds causing water odor decrease obviously, the total amount of algae and organic suspended matters accumulated in water body significantly decreases, and the dissolved oxygen of the water body significantly increases. The algae removal rate of the water body decreases by 88-97% (average: 93%) over the control area within three months after the project implementation. The transparency of the water body is raised from less than 15 cm to 60 cm within three days after the project implementation, and is 50 to 70 cm after three months. Volatile sulphur compounds causing water malodor decrease significantly. The average removal rates of DMDS, DMTS and MTL are 94%, 90% and 91% respectively. The biomass of reed root and the plant height increase by 45% and 35% compared with the control area. Thus, water malodor is basically eliminated; water pollution and malodor are obviously improved, water body is clear, and water ecological function is obviously improved.

What is claimed is:

1. A method for harmless treatment of cyanophycean accumulation in lakeside wetlands, comprising the following steps:
    Step 1: adding a flocculant to a water body to be treated, so that the flocculation of cyanophytes accumulates in a surface layer of the water body, and settling the formed cyanophycean floc to a surface layer of sediments;
    Wherein, the flocculant is a mixture of a modified starch solution and a sand suspension;
    Step 2: adding a floc stabilizer to perform accumulation and compaction of the cyanophycean floc and stabilized treatment of the floc in a surface layer of cyanophycean floc;
    Step 3: conducting reoxygenation treatment on the bottom water body.

2. The method according to claim 1, wherein, in step 1, modified starch of the modified starch solution is modified by a starch modifier, and the starch modifier is selected from diallyl dimethyl ammonium chloride or 3-chloro-2-hydroxypropyl trimethyl ammonium chloride; and the degree of substitution of the starch modifier is 0.25 to 0.60.

3. The method according to claim 2, wherein, in step 1, the starch modifier is diallyl dimethyl ammonium chloride; and the degree of substitution of the starch modifier is 0.25 to 0.60.

4. The method according to claim 2, wherein modified starch of the modified starch solution is prepared as follows:
    Step 1.1: weighing starch, adding distilled water and NaOH, then stirring and mixing well at 35° C. to make a 30% starch solution;
    Step 1.2: adding isopropanol before etherification of starch, stirring and mixing well, then adding a modifier to the starch solution to make cationic starch under ultrasonic action;
    Step 1.3: taking out the prepared cationic starch, and washing with absolute ethyl alcohol to remove excess unreacted modifier and isopropanol; after filtering, blowing off the starch paste in the presence of $N_2$, and then freeze-drying in vacuum to obtain a modified starch.

5. The method according to claim 1, wherein, in step 1, the sand is quartz sand with a particle size of 20-200 meshes, and the clay content in impurities is less than 1%.

6. The method according to claim 2, wherein, in step 1, the sand is quartz sand with a particle size of 20-200 meshes, and the clay content in impurities is less than 1%.

7. The method according to claim 5, wherein, in step 1, the flocculant is prepared by mixing the modified starch solution and the quartz sand suspension; and the modified starch solution is added into the water body to reach the final concentration of 0.5 to 6 g/L.

8. The method according to claim 1, wherein, in step 2, the floc stabilizer is quicklime, with a solid particle size of 0.01 to 5 mm and the impurity content of less than 5%, the quicklime is prepared into a suspension of 1 to 10 g/L, and the floc stabilizer is added in the form of underwater spraying.

9. The method according to claim 1, further comprising, in step 2, spraying a matrix modifier to the surface of the cyanophycean floc after floc stabilization, wherein the matrix modifier is a mixture of diatomite, carbon and lakeside soil of the water body, and the mass ratio of the three substances in the modifier is diatomite:carbon:lakeside soil=5-10:1.5-8:10-16.

10. The method according to claim 9, characterized in that the matrix modifier is applied by adding diatomite and carbon successively, and then adding lakeside soil, wherein the lakeside soil is mainly the dredged sediment near wetlands or bare soil on the lakeside, and the amount of the lakeside soil added to the water body finally reaches 10 to 200 g/L.

11. The method according to claim 9, wherein the carbon is selected from the biological carbon consisting of difficult-to-be-decomposed stems and leaves of the wetland plants and easy-to-be-decomposed stems and leaves thereof; the difficult-to-be-decomposed stems and leaves of the wetland plants are selected from one or more of reeds, cattails and straw stalks; the easy-to-be-decomposed stems and leaves thereof are selected from one or more of bitter herbs, *Potamogeton* malaianus and *Nymphoides peltatum* (Gmel.) O. Kuntze; and the mixing mass ratio of the difficult-to-be-decomposed stems and leaves of the wetland plants to the easy-to-be-decomposed stems and leaves thereof is 2-5:0.2-1.5.

12. The method according to claim 1, wherein, the reoxygenation treatment method in step 3 includes planting oxygenated aquatic plants to re-oxygenate the water body and/or adding a sodium percarbonate solution thereto; wherein the oxygenated aquatic plants are floating-leaved plants, the oxygenated aquatic plants are selected from a group consisting of *Myriophyllum* elatinoides Gaudich., *Nymphoides peltatum* (Gmel.) O. Kuntze and *Hydrocotyle verticillata*; and the sodium percarbonate solution is added by multi-point high-pressure injection to bottom algae flocs and surface sediments.

13. The method according to claim 1, wherein, in step 3, the reoxygenation treatment method is conducted as follows: planting oxygenated aquatic plants to re-oxygenate the water body and/or adding a sodium percarbonate solution thereto; wherein the oxygenated aquatic plants are selected from *Myriophyllum* elatinoides Gaudich. and *Nymphoides peltatum* (Gmel.) O. Kuntze; and the sodium percarbonate solution is added by multi-point high-pressure injection to bottom algae flocs and surface sediments.

* * * * *